United States Patent [19]
Marcus

[11] 3,990,826
[45] Nov. 9, 1976

[54] INJECTION BLOW MOLDING APPARATUS

[76] Inventor: Paul Marcus, 85 Pascack Road, Pearl River, N.Y.

[22] Filed: Mar. 6, 1975

[21] Appl. No.: 555,819

Related U.S. Application Data

[60] Continuation of Ser. No. 318,903, Dec. 27, 1973, abandoned, which is a division of Ser. No. 158,161, June 30, 1971, Pat. No. 3,776,991.

[52] U.S. Cl. .......................... 425/242 B; 425/246; 425/324 B; 425/387 B; 425/DIG. 211; 425/DIG. 216; 425/DIG. 232
[51] Int. Cl.² ................ B29C 17/07; B29D 23/02; B29D 23/03; B29E 1/00
[58] Field of Search ......... 425/324 B, 242 B, 387 B, 425/246, 342, DIG. 205, DIG. 209, DIG. 211, DIG. 215, DIG. 216, DIG. 203, DIG. 232, DIG. 213; 264/97

[56] References Cited
UNITED STATES PATENTS

| | | | |
|---|---|---|---|
| 2,371,195 | 3/1945 | Strauss | 425/438 |
| 2,441,525 | 5/1948 | Zesbaugh | 425/438 |
| 3,002,225 | 10/1961 | Goller | 425/324 B |
| 3,079,637 | 3/1963 | Marzillier | 425/387 B |
| 3,225,382 | 12/1965 | Hagen | 425/342 |
| 3,264,684 | 8/1966 | Moslo | 425/DIG. 209 |
| 3,694,124 | 9/1972 | Saumsiegle et al. | 425/432 |
| 3,752,615 | 8/1973 | Van Manen | 425/DIG. 209 |

FOREIGN PATENTS OR APPLICATIONS

| | | | |
|---|---|---|---|
| 4,120,840 | 5/1966 | Japan | 425/438 |
| 473,960 | 3/1972 | Japan | 425/DIG. 216 |

*Primary Examiner*—Francis S. Husar
*Assistant Examiner*—John McQuade
*Attorney, Agent, or Firm*—Kane, Dalsimer, Kane, Sullivan and Kurucz

[57] ABSTRACT

An injection blow molding machine includes a rotary indexing plate on which core rod assemblies are mounted for indexing, in a rotary path, through at least three stations. The first station is an injection station at which a plastic parison or preform is injected around the core rod and within a neck mold. The second station is a blow station at which air passes through the core rod into the parison thereby inflating it and forcing it against the surface of the selected blow mold cavity. The third station is an ejection station at which the finished plastic container is removed from the core rod and neck mold. In some applications there are four stations. The fourth station could be used to preheat or precool the core rods preparing them for the start of the ejection cycle. The fourth station in a suggested embodiment could be deployed for preparing for orientation the plastic parison by temperature control; and, thereafter, orientation takes place prior to blowing. Obviously the three and four station machine can be modulated to present a six and eight station machine respectively. In one embodiment, the core rods and supporting indexing plate are vertically reciprocal into and out of the injection mold, blow mold and removal mechanism. In another embodiment, the core rod assemblies do not reciprocate but the associated injection and blow molds and finished product removal mechanism are mounted for vertical reciprocation on a clamp plate. The blown finished containers are indexed to the ejection station at which the containers are removed from the machine. In the event the neck mold is of one-piece construction and the container neck includes threads, an unscrewing device acts to remove the bottle from the mold. If a neck mold of multiple section construction is utilized, the neck mold is opened by suitable mechanical means.

15 Claims, 19 Drawing Figures

INJECTION BLOW MOLDING APPARATUS

This is a continuation of application Ser. No. 318,903, filed Dec. 27, 1973, now abandoned. Ser. No. 318,903 is a division of Ser. No. 158,161 filed on June 30, 1971, now U.S. Pat. No. 3,776,991.

The present invention relates to an apparatus for making hollow plastic articles such as containers or bottles, by first injection molding a preform or parison and then transferring it to a position at which it is blown into conformation with the finished mold.

An object of this invention is to provide an improved blow molding apparatus with which a plurality of parisons are injection molded and thereafter transferred to a blow molding station at which the parisons are blown into finished shape, following which the formed articles are transferred to an ejection station for removal from the apparatus.

Another object is to provide an improved injection blow molding apparatus which minimizes if not eliminates the parting line on a container neck finish and/or a parison.

A further object is to upgrade injection blow molding production while minimizing cycle time by utilizing a multiple station molding technique including injection, blowing and ejection stations which are separately but adapted to be operated /simultaneously.

Still another object is to provide a multiple station injection blow molding apparatus of the foregoing type in which core rod assemblies index at each of the stations sequentially to form the selected injection blow molded article.

A still further object is to provide means for controlling the temperature of core rods and parison molds and plastic preforms in an apparatus of the foregoing type for optimum speed, product control and output.

An important object is to provide a machine of the foregoing type in which a station may be introduced for preparing and mechanically orienting the plastic parison to permit the resin to obtain its optimum properties prior to blowing.

Another important object is to utilize a parison preparation station prior to blowing in order to obtain increased blow-up ratios heretofore unrealized.

Other objects and advantages will be enumerated and also apparent from the following detailed description which is to be taken in conjunction with the accompanying drawings in which.

Referring initially to the embodiment of injection blow molding machine illustrated in FIGS. 1 to 8, three stations are provided, namely a preform or parison injection station 20, blowing station 22 and an ejection station 24. Core rod assemblies 26a, 26b and 26c extend upwardly towards the respective stations and are mounted on a rotary indexing plate 28 for movement to and from each station. The rotary indexing plate is supported for rotation by bed plate 30 which has associated therewith an indexing mechanism 32 for indexing the plate 28 in a manner well known to the molding art. As will be explained, the index mechanism can be vertically raised and lowered to provide for several mechanical actions.

Figure 1:
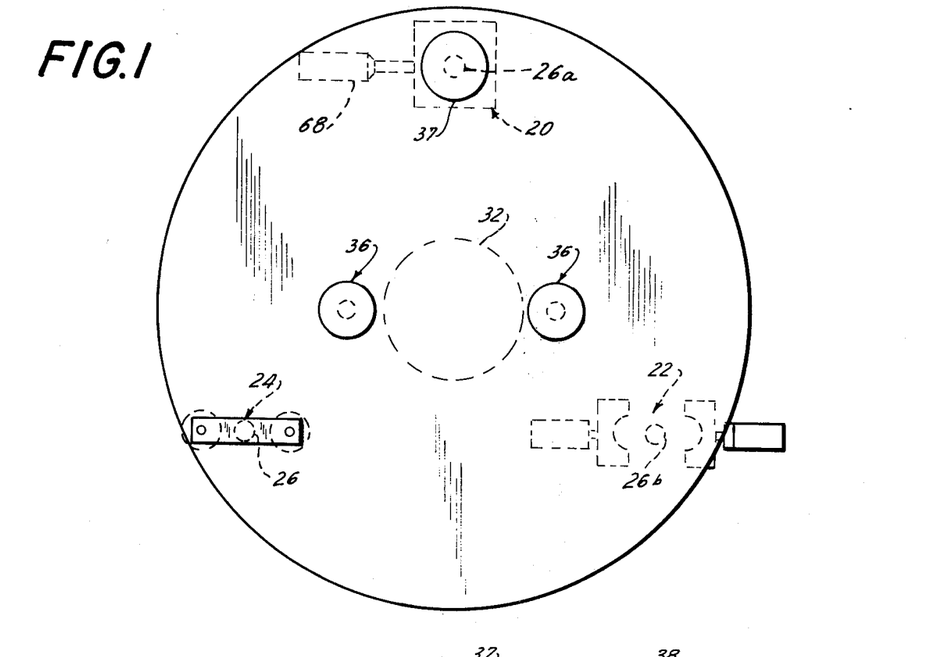
FIG. 1 is a top plan view of an indexing three station injection blow molding apparatus of this invention.
Figure 2:
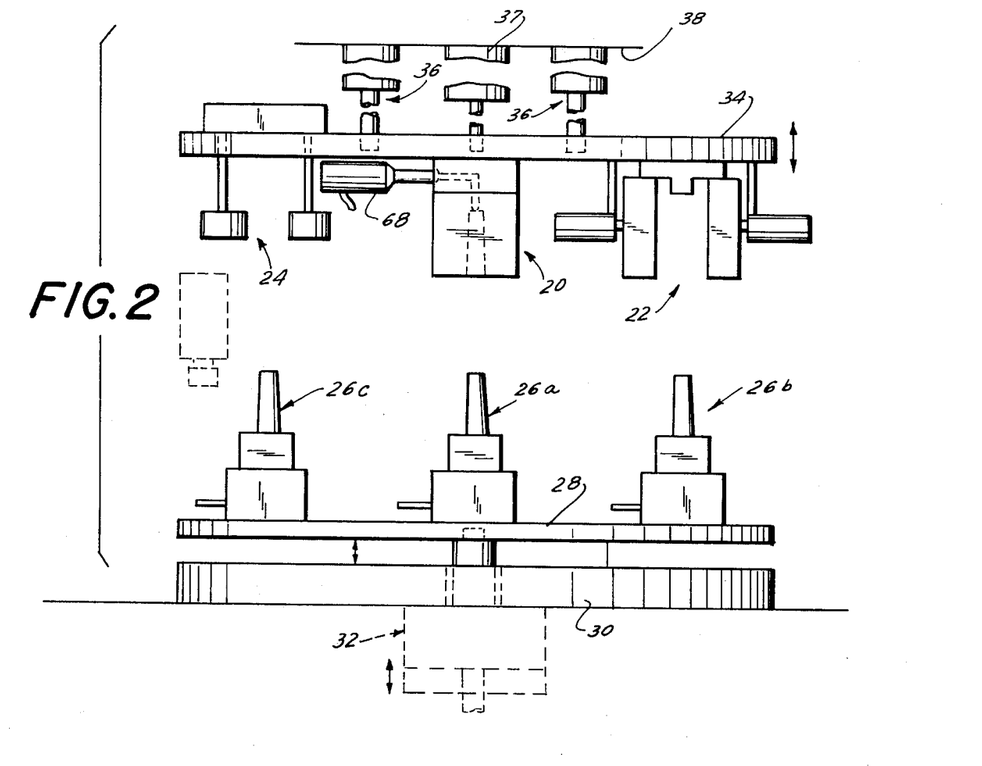
FIG. 2 is a side elevational view thereof showing a formed finished container in phantom at the ejection station.

The core rod assemblies 26 are adapted to be associated with each of the stations by rendering the latter vertically reciprocal towards and away the former. In this connection the stations 20, 22 and 24 extend downwardly from the vertically reciprocating clamping plate 34 which is supported by a number of jacking or clamping cylinder assemblies 36 extending downwardly from a stationary frame 38 of the machine. A jacking cylinder 37 is preferably provided at the parison injection molding station.

Figure 3:
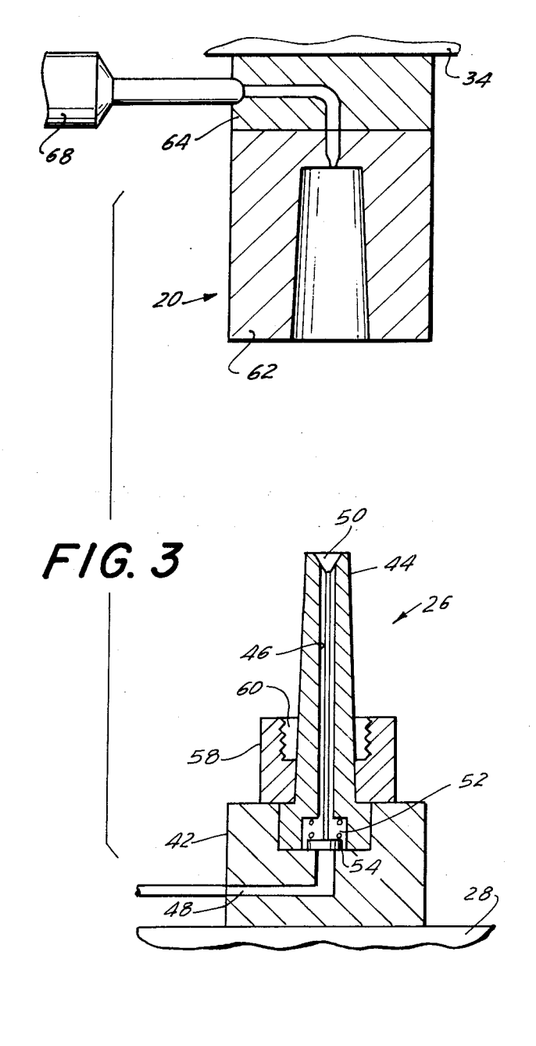
FIG. 3 is a longitudinal sectional view of an indexing core assembly with a neck mold associated therewith an open preform or parison forming mold of the injection station.
Figure 4:
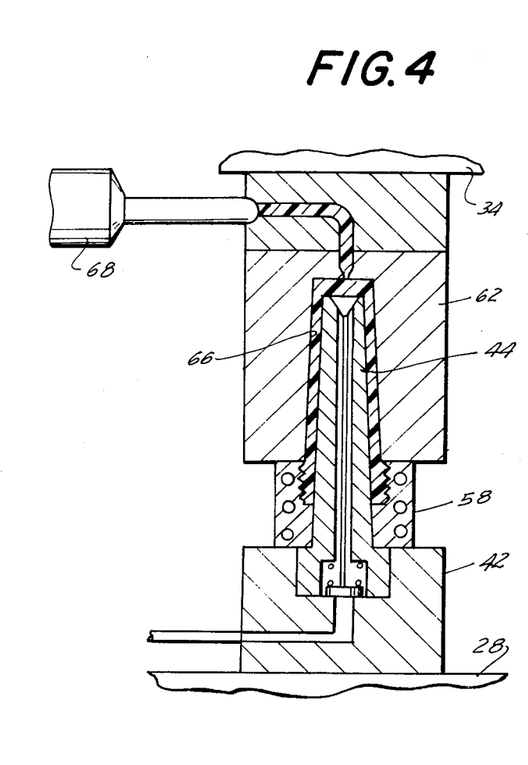
FIG. 4 is similar to FIG. 3 showing the parison mold in a closed position about the core rod to enable the injection molding of the parison.

At the injection station 20, shown in detail in FIGS. 3 and 4, is a plastic preform or parison 40. Although a single core rod assembly is shown at each station, it should be understood that rows or arrays of multiple core rod assemblies may be employed with the associated molds and product removal mechanisms for purposes of increasing molding and production of the selected articles. Thus, the illustrated single core rod assembly 26a at the parison station 20 is mounted on an assembly plate 42 from which extends vertical core rod 44. This rod 44 includes an axial passage 46 which is adapted to communicate with passage 48 in plate 42 coupled in turn with a source of air. A poppet valve 50 maintains the upper end of passage 46 closed because of the bias of spring 52 which acts upon disc 54 which is at the bottom end of the valve stem 56. In the illustrated embodiment the core rod assembly 26a also includes a one piece-neck mold 58 having a die cavity 60 of a threaded nature for forming threads on the neck of a container, bottle or jar as the case may be.

The parison injection mold 62 at injection station 20 is mounted by manifold or plate 64 extending downwardly from clamp plate 34. In all cases the hot plastic resin is injected through a single or multi-nozzle metering device into the parison mold 62 as well as neck mold 58. In the case of multiple nozzle metering and manifolding reference is made to U.S. Pat. No. 3,535,742. Suffice it to say that upon forward reciprocation of the clamp plate 34 the parison mold 62 will be lowered about the core pin 44 into engagement with the neck mold 58 to define the parison forming cavity 66. The parison 40 is formed wherein the selected plasticator or extruder (not shown) injects the selected plastic melt under controlled pressure into the selected single or multiple nozzle manifold 68. This device which may assume the form of the device disclosed in the above referenced patent acts as a reservoir in holding the plastic melt at a controlled temperature. The melt is distributed to the individual injection nozzles or gates as the case may be which, in turn, cause the plastic to fill each of the parison cavities 66. As discussed in the patent, should a multi-nozzle manifold be incorporated, the plastic is injected in such a manner that all cavities 66 fill simultaneously (or not simultaneously according to requirements), whereby all cavities will have the contained parison at uniform density, pressure and temperature. As will be appreciated where more than one core assembly is provided at each station, the cavities may not be the same size and, therefore, such uniformity will not be prescribed.

The cavity 66 is carefully temperature controlled electrically or by fluids (water or oil) in a manner well known to the art. These fluids may be cooled or chilled such that the cavity will have different heat zones permitting the maintenance of areas of the parison 40 at different temperatures to ensure the desired wall thickness, orientation, properties, and distribution of the finished plastic product. Towards this end the core 44, parison mold 62 and neck mold 58 may be independently cooled or heated to form a skin on the parison outer and inner surfaces. For example, the neckmold 58 in FIG. 4 is shown as containing temperature control means.

After the plastic parison 40 has been correctly "seasoned" in the parison mold 62, it is now ready for blowing. The clamp plate 34 will be reciprocated upwardly to elevate the air mold 62. The rotary indexing plate 28 and consequently the core assemblies 26 index to the next station. In the case of core assembly 26a, it will now rotate to station 22 previously occupied by core assembly 26b.

Figures 5, 6:
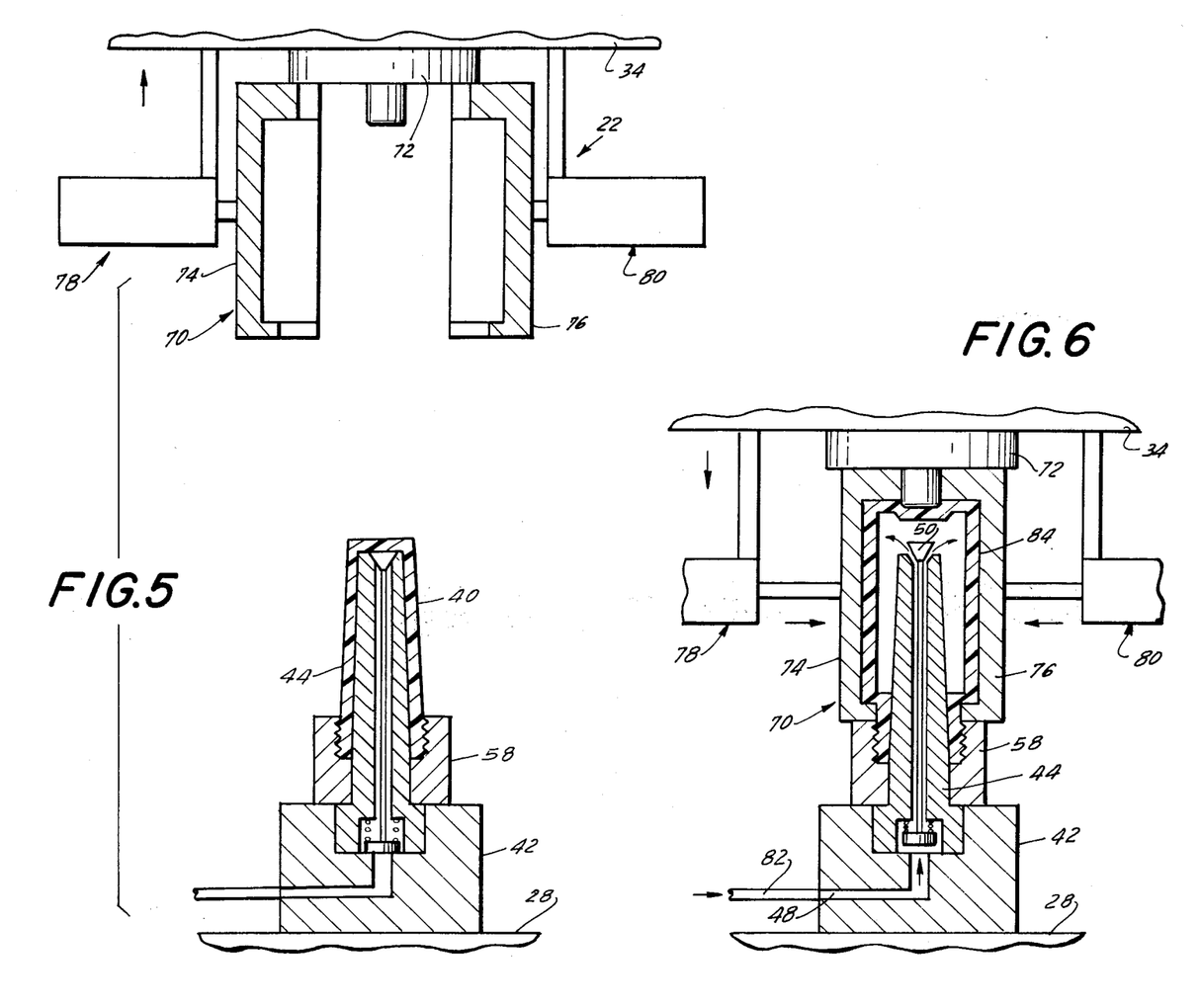
FIG. 5 is a longitudinal sectional view of the core assembly and formed parison shown indexed to the blowing station with the blow mold in an open position.
FIG. 6 is similar to FIG. 5 showing the blow mold closed about the core assembly with the parison blown into conformation with the blow mold die cavity walls.
Figure 7:
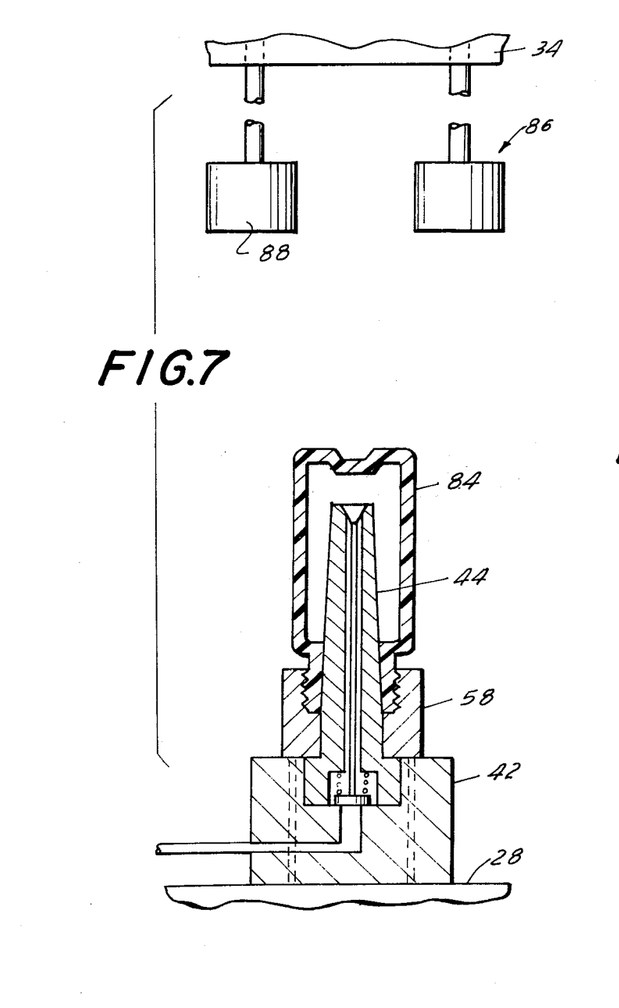
FIG. 7 shows the blown article about the core rod and the blow mold in its open position.

The blowing cycle starts by initially lowering the clamp plate 34 and index mechanism, which movement opens blow valves. The blow mold 70 at blowing station 22 may be of two or more parts as shown in FIGS. 5 and 6 which would include an upper vertically reciprocal or stationary die member 72 and laterally shiftable die members 74 and 76, each of which are mounted for reciprocal movement to the cylinder assemblies 78 and 80 respectively. The die member 72, 74 and 76 may be individually cooled or heated. When the clamp plate 34 is lowered, the blow mold 70 may be opened or in a clamped or closed position. In the case of the latter position, the closed blow mold 70, 74, 76 will be disposed about the core rod 44 while being clamped in closed position against the neck mold 58. In the event the blow mold 70 was in open position, it will be clamped closed when the clamp plate 34 is completely lowered. When this occurs, the indexing plate 28 is lowered into coupling relation with the bed plate 30. Air enters from the bed plate 30 through seals to the index plate 28. The air seals are mounted on a spring device (not shown) which is held to the bed plate 30. This arrangement permits the seals to float and thereby remain in relatively tight association with the index plate 28. The blown air then goes from the index plate 28 through an air pipe 82 into passage 48 of plate 42. If more than one core rod assemblies and corresponding blow molds are provided, the blown air is manifolded to each of the core rods 44. The poppet type blow valves 50 now open, which incidentally can be mechanically actuated as well where desired or for that matter be opened in any manner well known to the art. In any event blown air enters the parison 40 from the tip end of the core rod 44 or side, if desired. If other types and shapes of valves 50 are chosen depending on the design of the finished container, air may be made to enter at some other location, as for example through the core side walls near the neck mold 58. In any event the parison 40 is blown into conformation with the blow mold 70 to form the finished container 84. Thereafter, the blow mold 70 is opened and the clamping plate 34 is raised to permit the indexing plate 28 and consequently the core rod assembly 26a to be indexed to the ejection station 24.

When the core rod assembly 26a with blown container 84 comes to rest at the ejection station 24, the container may be removed in several ways. In the discussed embodiment and when employing a one-piece neck finish mold 58, the neck mold 58 may be stripped from the core rod 44 when the indexing plate is lowered from its normal position to its lowermost position in coupling relationship with the bed plate 30 (see FIG. 8a). Of course, this follows the lowering of the clamp plate 34 and when this occurs and the neck mold 58 as well as the finished container 84 is elevated relative to the core rod 44. This index mechanism eject stroke provides motion for mechanical action to strip or eject parisons, finished products, open neck molds, open air valves, orient and blow the plastic parts. An unscrewing mechanism 86 unscrews and removes the container 84 from the neck mold 58. Further assistance can be given by air blown through the core rod 44. The exemplary unscrewing mechanism 86 may be in the form of one or more rotating wheels 88 or a rotatable continuous belt (not shown).

An alternating unscrewing mechanism 86' may be in the form of a rotatable rod 88' which engages with accommodating surfaces in the base of the container 84 which, where desirable or necessary, may include a keying or other arrangement afforded by the associated surfaces of the container 84 and rod 88'.

After the container 84 has been unscrewed from the neck mold 58, it is removed by any one of many known mechanisms in the art and thereafter transferred in the desired aligned or upright position. Where desired, these containers may be stacked and eventually packaged in suitable receptacles or containers.

The cycle of obtaining the finished product 84 as a result of the excursion and indexing of core assembly 26a through stations 20, 22 and 24 is repeated as is the case with the other core assemblies 26b and 26c.

Figure 9:
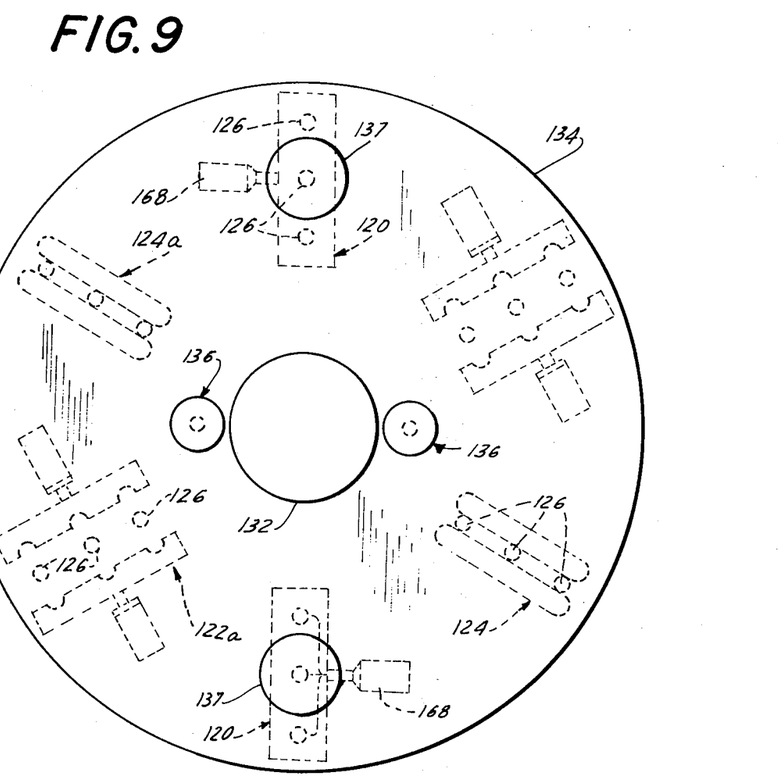
FIG. 9 is a top plan view of a six station injection blow molding machine in accordance with the present invention.
Figure 10:
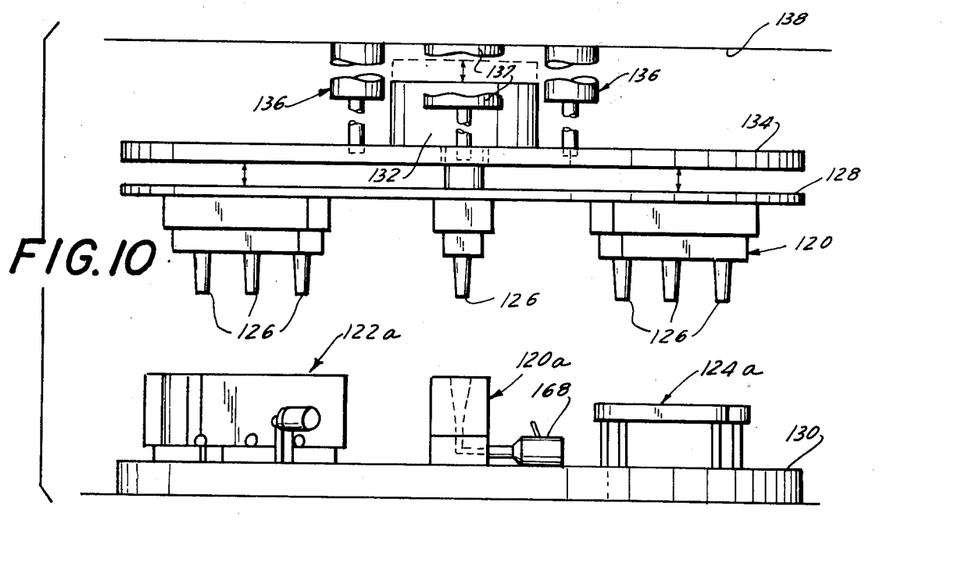
FIG. 10 is a side elevational view thereof showing a formed article in an upright position at the ejection station.
Figure 11:
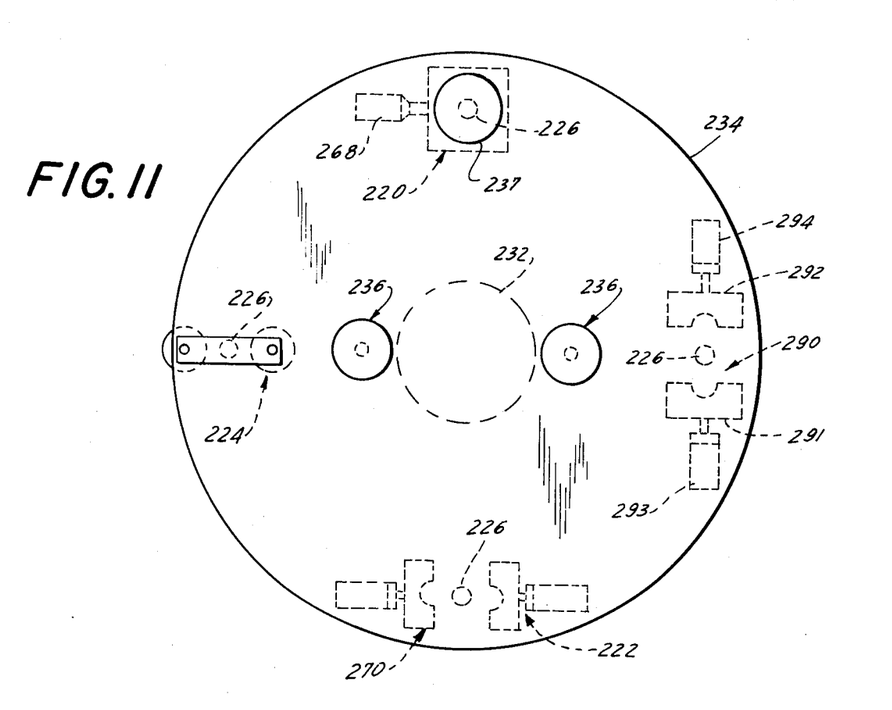
FIG. 11 is a top plan view of a four station injection blow molding machine of this invention in which a plastic orientation preparation station is interposed between the parison injection and blow molding stations.

In the embodiment of the invention illustrated in FIGS. 9 and 10, multiple core assemblies 126 are arranged in an array or other suitable arrangement on indexing plate 128. In this embodiment the indexing plate is disposed above the injection station 120, blowing station 122 and ejection station 124 which extend upwardly from a stationary bed plate 130. As will be observed the machine of this embodiment includes six stations which include another set of injection station 120a, blowing station 122a and ejection station 124a. In this manner, the production of the machine is increased many fold. In all other respects the details of the machine of this embodiment correspond with that disclosed in the embodiment of FIGS. 1 to 8 and will bear similar numbers increased by 100.

Referring now to the embodiment of the invention shown in FIGS. 11 to 14, a fourth station 290 is mounted by means of the clamp plate 234 between the injection station 229 and blow station 222. The stations of this embodiment are located approximately 90° from one another and the indexing of the core assemblies 226 rotate this amount while indexing as compared to the 120° station separation and core assembly indexing of the embodiment of FIGS. 1 to 8. In all other respects, the embodiment of FIGS. 11 to 14 are the same as the embodiment of FIGS. 1 to 8 and, accordingly, similar numbers will be employed increased by 200.

Figure 12:
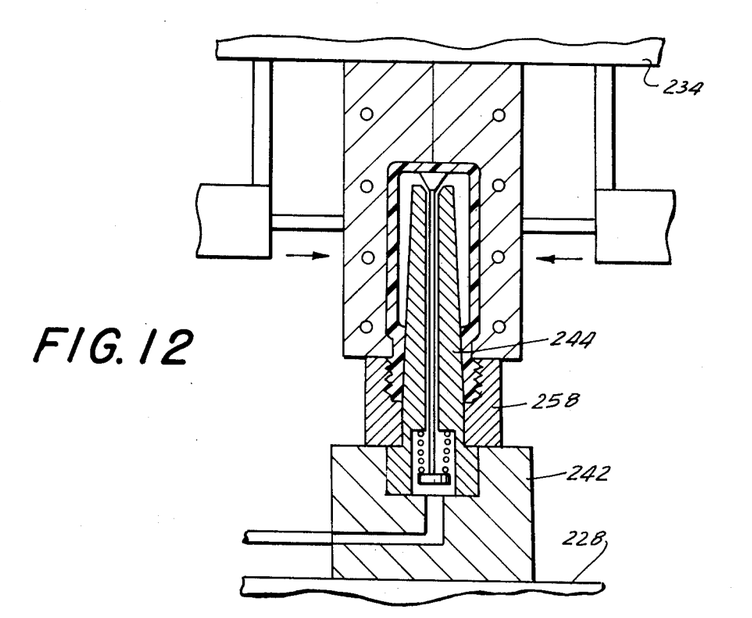
FIG. 12 is a longitudinal sectional view of the core assembly and associated parison at the orientation preparation station at which the parison is expanded slightly away from the surfaces of the core pin and brought to correct orientation temperature.
Figure 13A:
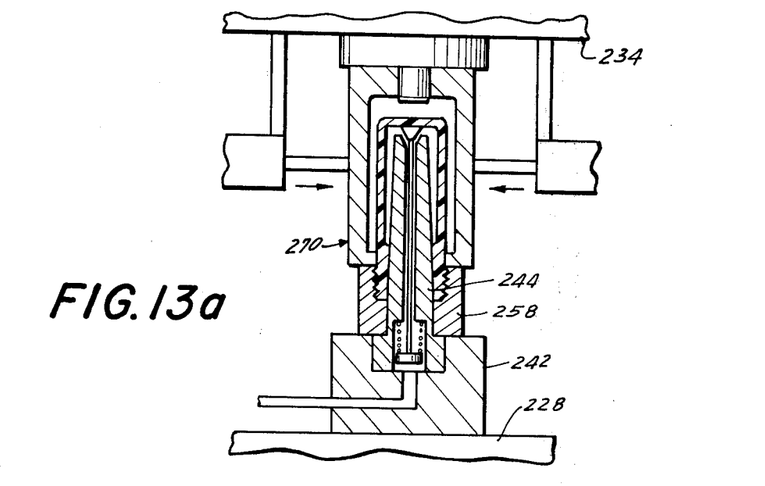
FIG. 13a is a longitudinal sectional view of the slightly expanded parison and core assembly at the blow molding station at which the blow mold is closed about the parison prior to orientation by mechanical stretching prior to blowing.
Figure 13B:
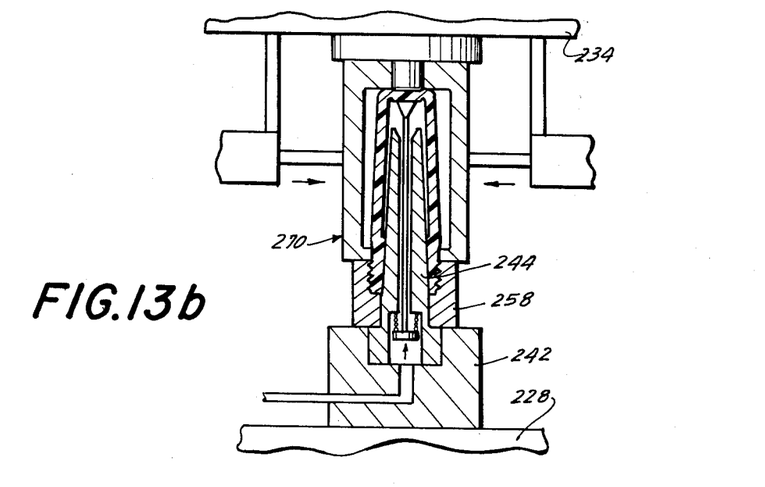
FIG. 13b is a similar view showing the parison stretched mechanically prior to blowing.
Figure 14:
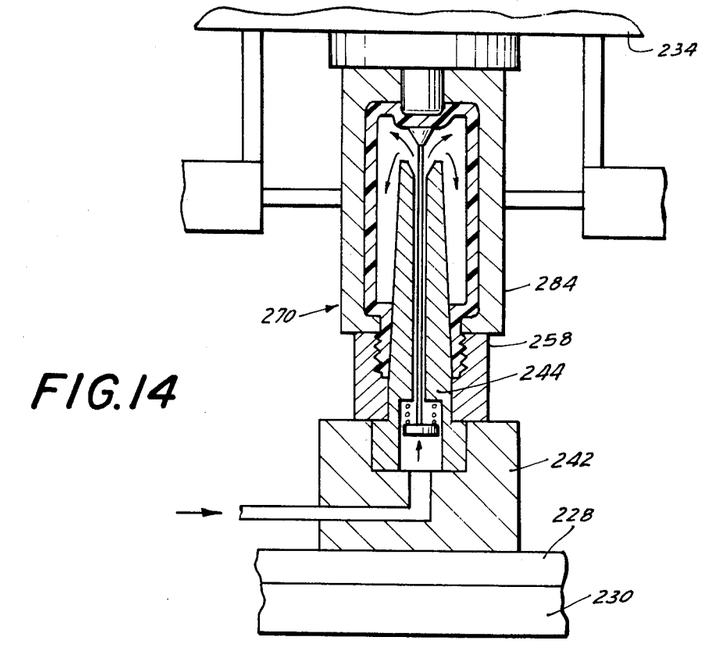
FIG. 14 is a similar view showing the stretched parison blown into conformation with the walls of the blow mold cavity.

At the station 290 the injected parison is air separated from the associated core rod 244 into conformity with the walls of the interim closed or clamped mold halves 291 and 292 to temperature prepare the parison for further blow or orientation. These molds halves 291 and 292 are adapted to be opened hydraulically by the cylinder assemblies 293 and 294 respectively to permit indexing of the core assemblies 226. The cavity provided by the mold halves 291 and 292 is smaller than that defined by the blow mold 270 which defines the finished product 284 and each of the mold halves 291 and 292 contain temperature control means as shown in FIG. 12. The principal purpose of the interim station 290 is to bring and maintain the parison to the optimum temperature for orientation. For this purpose experience has shown that minimal separation of the parison from the core pin 244 should be sought. Where it is desired to increase blow-up ratio, maximum separation is sought. In addition, the air pressure employed for purposes of separating the parison 240 from the core pin 244 should be maintained at a minimum. When the air separated parison of FIG. 12 is indexed to the next station 222 for blowing following opening of the mold halves 291 and 292, it will be disposed between the closed and clamped blow mold 270 (see FIG. 13b) and there stretched mechanically. This is accomplished by mechanically shifting the poppet valve stem 295 in a manner suggested earlier herein; and that is illustrated in FIG. 13b incident to the closing of the space between indexing plate 228 and bed plate 230. The parison will thus be stretched or oriented mechanically prior to blowing as shown in FIG. 13b. When the index plate 228 and bed plate 230 are coupled the blowing cycle starts and the mechanically expanded parison is blown into conformity with the blow mold 270 as shown in FIG. 14. Obviously other mechanisms for stretching the parison prior to blowing may be employed as for example by the utilization of external means which grip the exterior of the parison of FIG. 12 and pull it upwardly to the desired extent.

Figure 8A:
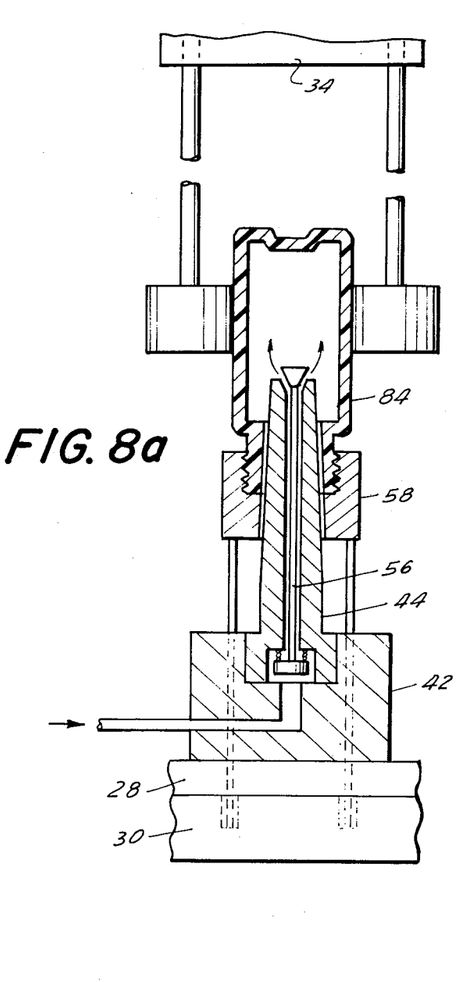
FIG. 8a is a longitudinal sectional view showing the core assembly and associated blown article indexed to the ejection station at which an unscrewing mechanism operates to remove the blown article from the core rod.
Figure 8B:
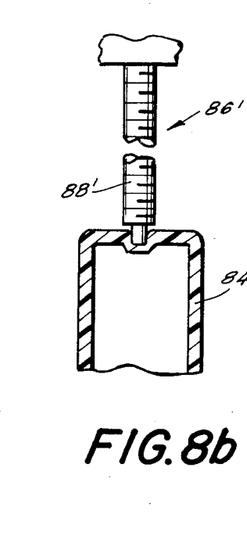
FIG. 8b is similar to FIG. 8a but showing another form of article unscrewing mechanism.
Figure 15:
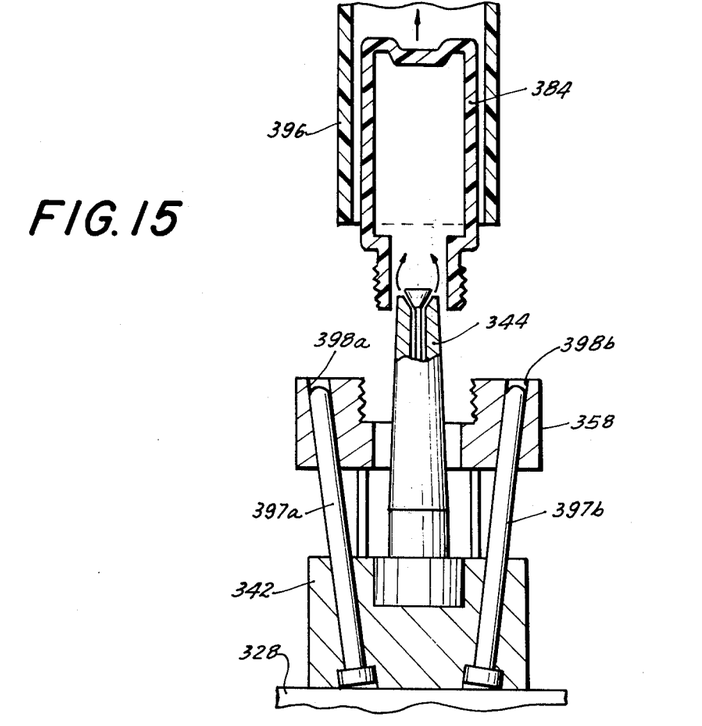
FIG. 15 is a longitudinal sectional view at the ejection station showing the opening of a split neck mold by diverging cam pins prior to product removal.

In FIG. 15 a mechanism is illustrated for incorporation and mounting at the ejection station 24 as an alternative to the mechanisms illustrated in FIGS. 8a and 8b, especially when using a split neck mold 358. As will be appreciated, the finished container 384 is not unscrewed but rather simply released and then removed from the core rod 344 in any one of several manners such as by means of suction or vacuum in closely associated vacuum tube 396 which conveys the container 384 to the desired location. The split neck mold 358 may be parted or separated by any one of a number of techniques such as cams, toggles, hydrocylinders, etc. and including the illustrated angle cam pins 397a and 397b which extend upwardly from plate 342 into accommodating holes 398a and 398b, respectively. Thus, as the neck mold 358 is pushed upwardly, as the index plate 328 and bed plate 330 are shifted into coupling relationship, the cam pins 397 separate the split mold 358. When the neck mold 358 is lowered, the cam pins 397 operate to return the split mold 358 into its closed position for purposes of molding the neck.

Figure 16:
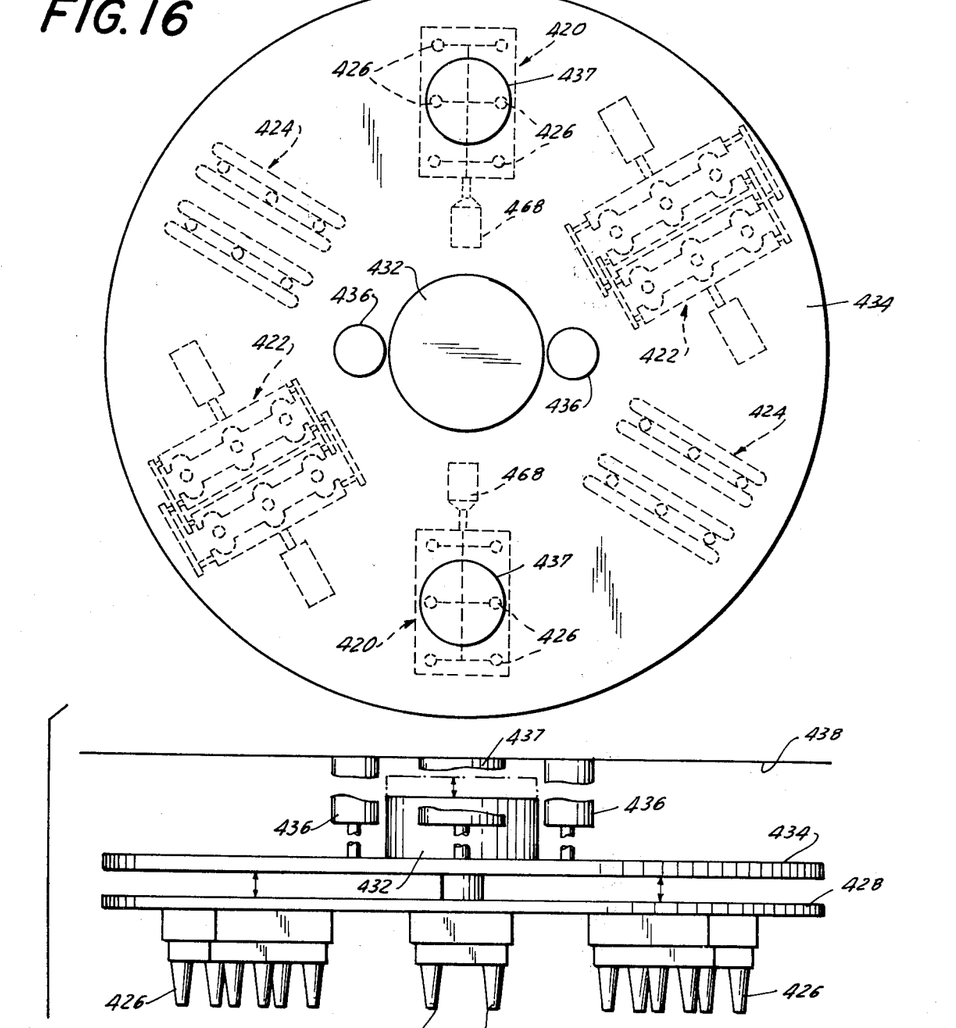
FIG. 16 is a top plan view of an injection blow molding machine having more than one row of core rod assemblies at each station.
Figure 17:
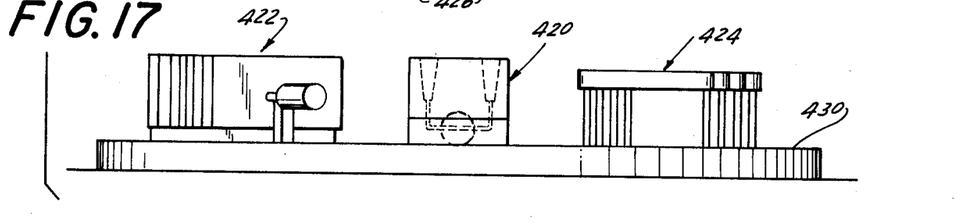
FIG. 17 is a side elevational view thereof.

In the embodiment of FIGS. 16 and 17, at least two and in some instances several rows of core rod assemblies 426 may be provided at each station. Otherwise, reference should be made to the embodiment of FIGS. 1 to 8 for details; and as in the case of the previous embodiment, similar numbers will be employed increased by 400. Suffice it to say that the manifold at the injection station 320 may parallel that discussed into the aforenoted patent. At the blowing station 322, each mold halve may be independently actuated by its own hydraulic cylinder, or corresponding halves may be coupled or linked as shown to a common cylinder.

Thus, the several aforenoted objects and advantages are most effectively attained. In addition, the following contributions afforded by the present invention should be noted:

1. It is possible to produce jars, bottles, cups, tubs, either with small necks, large bodies, or large openings and tapered bodies, as well as the same products capable of being made on commercially available injection blow molding machinery, extrusion blow machines, thermoforming machines, and injection molding machines.

2. It is possible to produce containers with wall thicknesses ranging between 0.003 to more than 0.250 inches.

3. It is possible to incorporate more mold cavities in a relatively small area than available injection blow molding systems. Therefore, the apparatus of the present invention is more productive. Towards this end, several rows of molds may be incorporated and therefore even higher production rates are possible.

4. It is possible to employ faster cycle times particularly in view of the one piece solid traveling neck mold which provides the best heat transfer system. This is also true for the one piece solid injection mold and core rod assemblies.

5. Molding and clamping forces are better controlled compared to prior art systems particularly in view of the fact that during the injection cycle the injection forces and the clamping forces are in the same direction at the injection station.

6. The apparatus and process of injection molding is not only simpler than that of existing equipment but facilitates the attainment of better control over shot size, pressure, parison temperature and uniformity. In addition, less expensive yet longer lasting molds may be employed.

7. The solid one piece neck mold reduces cost because it is not split and the one mold is associated with the container neck throughout the entire molding process. This neck also provides uniform common cooling around the entire periphery of the neck. No parting lines and consequently flashes are possible. Cycle time is also reduced because of the utilization of this type of neck mold. Therefore, special neck clamp mechanisms are eliminated as well as the need for more than one neck mold to be associated with the neck of the container during the molding process. The neck mold also permits accurate control over neck dimensions and the maintenance of the prescribed tolerances.

8. Automation is enhanced as a result of the novel unscrewing mechanisms herein. Furthermore, safety is provided by positive ejection of unblown parison and/or blown parts.

9. Through orientation and stretching, the blown-up factor may be increased many fold and certainly by at least a factor of two. Wall thickness of the finished product is also more closely controlled.

Although several somewhat preferred embodiments have been disclosed and described in detail herein, it should be understood that this invention is in no sense limited thereby and its scope is to be determined by that of the appended claims.

I claim:

1. An injection blow molding apparatus comprising:
    an injection station, including means at the injection station for injection molding a parison of selected configuration;
    a blowing station, including means at the blowing station for blow molding the parison into the selected finished product;
    an ejection station, product removing means at the ejection station for removing the finished product from the apparatus;
    first, second and third core rod assemblies each having an axis being selectively disposed respectively at each of the injection station, blow station and ejection station, each of said core rod assemblies being mounted on a rotatable index plate having an axis of rotation parallel to the axis of the core rod assemblies, said parison molding means, blow molding means, and product removing means being mounted on a plate means spaced from said index plate so that said core rod assemblies are spaced from their associated parison molding means, blow molding means and product removing means;
    indexing means operatively connected to the index plate for moving the index plate and the core rod assemblies mounted thereon and the parison and finished product thereon rotationally about the axis of the index plate and indexing them, respectively, at the blowing station following the injection station and the ejection station following the blowing station;
    reciprocating means connected to one of said index plate or said plate means for causing relative reciprocation between the core rod assemblies and the associated parison molding means, blow molding means, and product removing means in a direction parallel to the axis of said index plate so that a clamping position is attained at which one core rod assembly cooperates with the parison molding means for forming the parison about a core rod of the core rod assembly, the second core rod assembly cooperates with the blow molding means whereby the parison is blown into the desired configuration to form the selected finished product, and the third core rod assembly cooperates in directing the finished product to the product removing means for removal from the apparatus; and
    whereby upon actuation of the reciprocation means the parison is reciprocated and transferred away from the injection molding means, then moved transversely to the blow station upon actuation of the indexing means and then reciprocated by the reciprocating means and transferred to the blow molding means and the finished product is transferred from the blow molding means to the product removing means at the ejection station along corresponding paths and by corresponding means.

2. The invention in accordance with claim 1 wherein the parison molding means, blow molding means and product removing means are mounted on a common nonrotatable clamp plate forming part of said plate means, said plate means including said reciprocating means which reciprocates the clamp plate and consequently the mounted parison molding means, blow molding means and product removing means towards the index plate and the mounted core rod assemblies.

3. The invention in accordance with claim 1 wherein a fixed bed plate is provided and the index plate is disposed between the fixed bed plate and the clamp plate, means permitting relative movement between the index plate and the bed plate to permit the index plate to assume a first position at which it is spaced from the bed plate and a second position at which it is in close proximity to the bed plate, the second position of the index plate relative to the bed plate is assumed when the core rod assemblies are associated with their respective parison molding means, blow molding means, and product removing means, the product removing means including stripping means to strip the finished product from the associated core rod.

4. The invention in accordance with claim 1 wherein the parison molding means, blow molding means and product removing means are all mounted on a bed plate which is stationary forming part of the plate means, a clamping plate, and the index plate on which the core assemblies are mounted is interposed between the clamping plate and bed plate and spaced a relatively close distance from the clamping plate, means interconnecting the clamping plate and index plate for relative reciprocation relative to one another to shift the index plate from its spaced position to a position in contact with the clamping plate following actuation of the reciprocation means placing the core rod assemblies in coupling relationship with the parison molding means, blow molding means and product removing means.

5. The invention in accordance with claim 1 wherein the finished product is a container having a neck, a neck mold associated with the core rod assemblies and cooperating with the parison molding means, the neck mold remaining with the injection molded parison and core rod assembly when indexed to the blowing station and during the blow molding of the parison to the finished product.

6. The invention in accordance with claim 5 wherein the neck mold is of one piece construction having means for cooling the neck portion of the parison following its injection molding.

7. The invention in accordance with claim 5 wherein the neck mold is a split molding having at least two parts and means associated with the core rod assemblies for opening the mold parts to permit removal of the finished container and for permitting closing of the mold parts when the core rod assemblies are indexed for the injection station and blowing station.

8. The invention in accordance with claim 5 wherein means are associated with the core rod assemblies for shifting the neck mold axially of the associated core rod to strip the finished product from the core rod at the ejection station to facilitate the removal of the finished product by the product removing means.

9. The invention in accordance with claim 8 wherein the neck of the finished product includes threads and the neck mold defines a mold cavity for forming said threads, said product removing means including means for engaging the product and rotating it relative to the neck mold to unscrew the neck of the finished product from the neck mold.

10. The invention in accordance with claim 9 wherein the unscrewing means includes rotatably driven members engageable with the finished product and at opposed locations of the finished product.

11. The invention in accordance with claim 9 wherein the unscrewing means includes a rotatably driven rod engageable with accommodating surfaces of the base of the finished product.

12. The invention in accordance with claim 1 wherein the apparatus includes at least one more injection station, blowing station, and ejection station arranged on said plate means and associated opposed core rod assemblies on the index plate.

13. The invention in accordance with claim 1 wherein a parison orienting means is provided on said plate means for orienting the parison between its injection molding and its blowing at the blowing station and an additional corresponding core rod assembly is provided on said index plate.

14. The invention in accordance with claim 1 wherein a parison orienting means is provided on said plate means for orienting the parison between its injection molding and its blowing at the blowing station and an additional corresponding core rod assembly is provided on said index plate, the parison orienting means includes a molding means for expanding the parison slightly to free it from the associated core rod with temperature control means also being provided for placing the slightly expanded parison at a predetermined temperature, and means at the blowing station for mechanically stretching and orienting the slightly expanded parison in the blow mold prior to blowing.

15. The invention in accordance with claim 14 wherein the means for mechanically stretching the parison includes a poppet valve forming part of the associated core rod assembly, and means coupled with the poppet valve for engaging the interior surfaces of the base of the parison and shifting it away from the associated core rod to mechanically stretch the parison.

* * * * *

UNITED STATES PATENT OFFICE
CERTIFICATE OF CORRECTION

PATENT NO. : 3,990,826
DATED : November 9, 1976
INVENTOR(S) : Paul Marcus

It is certified that error appears in the above-identified patent and that said Letters Patent are hereby corrected as shown below:

Column 1, line 27, "separately" should be --separate--;

Column 1, line 56, after "therewith" insert --and--;

Column 3, line 23, "forward" should be --downward--;

Column 5, line 31, "229" should be --220--;

Column 8, line 20, "reciprocation" should be --reciprocating--;

Column 8, line 39, "1" should be --2--.

Signed and Sealed this

Eighth Day of February 1977

[SEAL]

*Attest:*

RUTH C. MASON
*Attesting Officer*

C. MARSHALL DANN
*Commissioner of Patents and Trademarks*